(12) United States Patent
Mueller

(10) Patent No.: US 6,540,402 B1
(45) Date of Patent: *Apr. 1, 2003

(54) HYDROSTATIC GUIDANCE OF MOVING LATHE CARRIAGE

(75) Inventor: Peter Michael Mueller, Suwanee, GA (US)

(73) Assignee: Fitel USA Corporation, Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/500,154

(22) Filed: Feb. 8, 2000

(51) Int. Cl.[7] ................................. F16C 32/06
(52) U.S. Cl. ........................................ 384/10
(58) Field of Search ..................... 384/12, 10, 13, 384/45, 42

(56) References Cited

U.S. PATENT DOCUMENTS 4,217,227 A    8/1980  MacChesney .............. 350/96.3
4,744,675 A *  5/1988  Sakino et al. .................. 384/12
5,971,614 A * 10/1999  Kane et al. .................... 384/12
6,315,449 B1 * 11/2001  Mueller ........................ 384/10

* cited by examiner

*Primary Examiner*—Lenard A. Footland
(74) *Attorney, Agent, or Firm*—Thomas, Kayden, Horstemeyer & Risley, LLP

(57) ABSTRACT

A hydrostatic guidance system for the torch carriage used in an MCVD system has a plurality of air bearings mounted on the carriage and a pressurized fluid manifold device for routing pressurized fluid, such as air, to the several air bearings. The several bearings are located and oriented on the carriage adjacent the rails or ways of the lathe bed so that the carriage is made to float, contact free, over the ways for smooth, jerk free movement. The manifold house valve adjustments for controlling the amount of air routed to each air bearing, and the spacing of each bearing from the adjacent way is controlled by adjustable studs having the air bearings mounted on the ends thereof.

21 Claims, 4 Drawing Sheets

HYDROSTATIC GUIDANCE OF MOVING LATHE CARRIAGE

RELATED APPLICATIONS

This application concerns subject matter related to that shown in U.S. patent application Ser. No. 09/353,943 of Mueller et al., filed Jul. 15, 1999, the disclosure of which is incorporated herein by reference.

FIELD OF THE INVENTION

This invention relates to an apparatus for supporting and guiding a movable lathe carriage and, more particularly, to such an apparatus for use in the MCVD process for producing optical fiber.

BACKGROUND OF THE INVENTION

Optical fiber of the type used to carry optical signals is fabricated typically by heating and drawing a portion of an optical preform comprising a refraction core surrounded by a protective glass cladding. Presently there are several known processes for fabricating preforms. The modified chemical vapor deposition (MCVD) process, which is described in U.S. Pat. No. 4,217,027, issued in the names of J. B. MacChesney et al. on Aug. 12, 1980 and assigned to Bell Telephone Laboratories, Inc., has been found to be one of the most useful because the process enables larger scale production of preforms which yield very low loss optical fiber.

During the fabrication of preforms by the MCVD process, reactant-containing gases, such as $SiCl_4$ and $GeCl_4$ are passed through a rotating substrate tube suspended between the headstock and tailstock of a lathe. A torch assembly, which heats the tube from the outside as the gases are passed therethrough, traverses the length of the tube in a number of passes, and provides the heat for the chemical reactions and deposition upon the inner wall of the tube. The torch assembly also supplies the heat for collapsing the tube to form a rod, and, in subsequent operations, for collapsing an overclad tube onto the rod, as explained in the aforementioned Mueller et al.—'943 application. In the current manufacture of preforms, the torch is mounted on a carriage which is a solid structure supported and guided on the lathe or machine bed. The guidance of the carriage along a specific path is usually accomplished through the use of a typical three sided gib and way system, with the carriage having rolling or sliding elements attached and in contact with the tops, sides, and bottoms of a dual way system. Linear guide rails having various cross-sections for rolling and sliding elements and mounted to the bed may be used as an alternative. In the systems as currently used, the sliding or rolling elements are in direct contact with the bed of the lathe or machine. In all such systems, the movement of the carriage and the physical contact between it and the bed requires lubrication to eliminate wear and friction. An initial "stick-skip" condition must be overcome during the start of carriage motion which is a result of the friction, and the friction can also induce "jerk" in the movement of the carriage along the bed. In addition, the friction can cause or induce, over a period of time, freeplay in the system as a result of wear. Thus, where a smooth uniform velocity of the torch down the length of the tube is a necessity for uniformity of heating and deposition and, ultimately, a uniformity of product, the friction effects can, and most often do, cause a non-uniform velocity profile, and, as a consequence, non-uniformity of heating and deposition, which result in non-uniformity of product. In present day practice, friction is overcome, at least in part, through the use of lubricants which, during a production run, become a contaminant to the process and spread throughout the machine. This, in turn, necessitates frequent cleaning of the apparatus which is detrimental to the goal of substantially continuous production. Further, the lubricant does not completely eliminate the stick-slip and jerk problems which, as pointed out in the foregoing, most often lead to a non-uniform velocity profile.

SUMMARY OF THE INVENTION

The present invention is a hydrostatic guidance and support system for the movable carriage upon which the torch for the MCVD process is mounted. The carriage, as used on the MCVD lathe, is machined with integral air bearing components which, in their geometry, match the lathe bed cross-section. Fluid, such as air, under pressure, is delivered to the bearings which, under pressure of the air, in use, cause the carriage to float in spaced relationship to the lathe, thereby producing a nearly friction free support and guide for the carriage, which results in a smooth velocity profile, which, in turn, produces a drastic improvement in the quality (and quantity) of the MCVD product. The terms "fluid" and "air" will be used interchangeably hereinafter.

In greater detail, the carriage comprises a top plate to which the torch is mounted, first and second side walls depending from the top plate, and first and second inward facing guidance members in the form of flanges extending inwardly from the bottoms of the side walls. The top plate has four downwardly oriented threaded bores extending therethrough which are spaced to overlie the rails or ways of the lathe bed. Threaded studs are mounted in the bores, each stud having a partially spherical end face which fits into a hole having a spherically shaped bottom in a porous pad member thereby creating a ball joint to hold the member in place, especially while in motion. In like manner, each of the side walls has similar bores aligned with the sides of the lathe rails and in which similar studs are mounted which hold similar porous pads. Each of the flanges has a pair of bores therein for studs which also hold porous pads beneath the ways or rails of the lathe.

On each of the side walls is mounted an air manifold having at least one air input, and six outputs having needle valves mounted therein. Thus, when pressurized air is supplied from a source to the manifold, each needle valve has a quantity of pressurized air emerging therefrom. The output of each needle valve is supplied by means of suitable tubing, to a porous pad, and each manifold supplies air to six of the pads of which there are twelve in all. Each pad, which preferably comprises porous graphite and which has a smooth porous face, has an input to which the pressurized air from the manifold is supplied. With all of the pads in place and with its pressurized air from the source being at an adjusted value of, for example, fifty-five (55) pounds per square inch, the needle valves and the threaded studs are used to fine tune the air pressure to the point where the carriage floats free of contact with the lathe bed, but properly centered on all axes. The carriage, which may be moved longitudinally by any of a number of drives, such as a worm drive, a rack and pinion drive, or a belt drive, for example, is then movable without friction along the lathe bed, thereby insuring a substantially uniform velocity profile.

In a first embodiment of the invention, each side wall has three air passages drilled therethrough at each end, and three of the air hoses from the corresponding manifold are coupled through each group of three passages to the three pads at each end. In a second embodiment, the manifold outputs are coupled directly, by means of air hoses, to each of the pads. In both embodiments, inasmuch as there is no contact between the carriage and the lathe bed, lubrication and contamination of the MCVD process are eliminated.

The hydrostatic carriage arrangement of the invention eliminates most of the maintenance associated with existing mechanical linear slide systems, the clogging of the lubricants in the elements, the contaminants to the process area, and velocity uniformities. Also, because friction is substantially eliminated, the prime mover of the carriage, e.g., rack and pinion, having less of a load thereon, may be downsized in terms of the power requirements necessary to move the carriage.

These and other features and advantages of the present invention will be readily apparent from the following detailed description, read in conjunction with the accompanying drawings.

DETAILED DESCRIPTION

Figure 1:
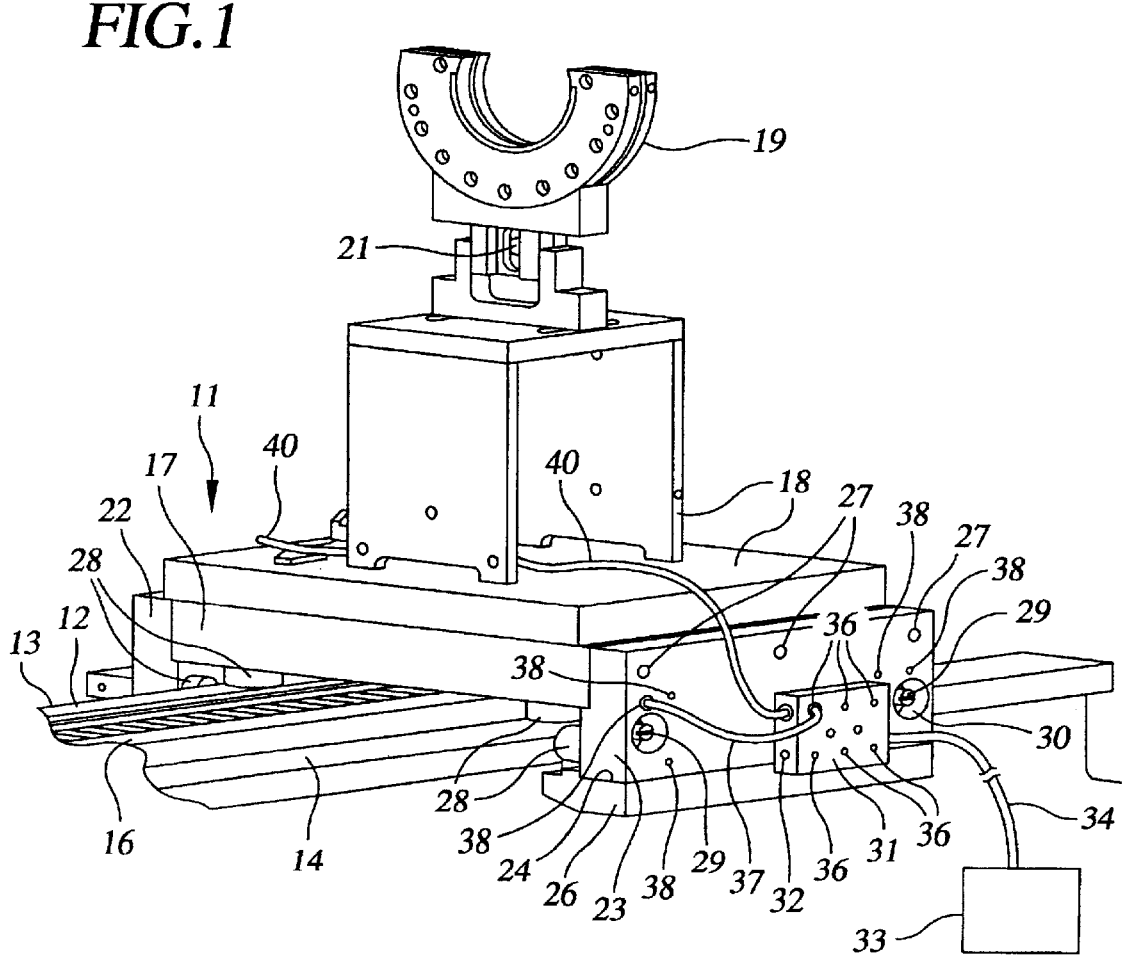
FIG. 1 is a perspective view of the apparatus of the invention mounted on a lathe bed.

FIG. 1 is a perspective view of the carriage 11 of the present invention depicting the essential parts thereof as mounted on a lathe bed 12. As noted hereinbefore, the invention will be described as used on a lathe bed 12 used in the MCVD process. However, the invention, as embodied in the carriage 11 may be adaptable for other configurations where jerk-free, smooth movement of an element is desired in order, primarily, to produce a uniform velocity profile, as well as to reduce wear. As can be seen in FIG. 1, lathe bed 12 comprises first and second spaced rails or tracks 13 and 14 extending along the length of the bed onto which carriage 11 is movably mounted. Carriage 11 may be driven longitudinally by any suitable or conventional means 16, which schematically represents a rack and pinion drive, but is also intended as a representation of a worm drive or a belt drive, for example. Thus, the carriage 11 is mounted on the rails 13 and 14 and, during operation, driven back and forth along the length thereof by means of the drive 16. Mounted on the top plate 17 of the carriage 11 is a bracket or support member 18 upon which is mounted the torch or heater member 19 used in the MCVD process. As can be seen, torch 19 has a vertical adjustment 21 for fine tuning its vertical height above the bracket 18 and hence, the lathe bed 12. Top plate 17 has depending therefrom spaced side walls 22 and 23 at the bottom 24 of each of which is an inwardly extending flange member 26. As thus far described, carriage 11 is similar to carriages in present use, and may be milled from a single block of suitable metal, such as aluminum, or made from separate metallic parts 17, 22, 23, 26 bolted together as shown by bolts 27, for example. In practice, carriage 11 has bearings or slides (not shown) which bear against the rails 13 and 14 and which, as discussed previously, are lubricated to reduce "stick-skip" and "jerk" during movement along lathe bed 12. The carriage 11 of the present invention is designed and constructed to overcome these problems and to achieve a substantially uniform velocity profile.

In accordance with the invention, the usual bearings or slides are replaced by a plurality of pads or air bearings 28 which are porous to the passage of air or other fluid therethrough, being made of, for example, a porous graphite material which has, as will be discussed more fully hereinafter, a smooth, flat, porous face adjacent the rails. Pads 28 are held in place by threaded studs 29 which are carried in threaded bores 30 and which provide adjustment of the pads 28 and thus separation from the surfaces of the rails or ways 13 and 14. While the term "air" is used herein, it is to be understood that other lo fluids, preferably gaseous but in some cases, possibly liquid may be used instead of air. An air manifold 31 is mounted on each of the side walls 22 and 23. Each of the manifolds 31 has several air inputs 32, at least one of which (not shown) is connected to a source 33 of pressurized air by an air conduit 34. Where only a single air source 33 is used, one of the input ports 32 on the first manifold 31 can be made to function can be made to function as an output which, as best seen in FIG. 5a is directly connected to the input port 32 that is connected to air source 33, to supply air through an air passage conduit 40 to an input port of the second manifold 31, which is not shown in FIG. 1 but which is substantially identical to the one shown. Alternatively, a bore such as bore 45 in FIG. 3 which passes through carriage 11 can function as an air passage or as an internal passageway for a conduit 40. The second manifold 31 is then connected to the air passage in the same manner as described hereinafter with respect to the air supply to pads 28 through conduits 42. It is, of course, possible to use a second air supply 33 to supply pressurized air directly to the second manifold 31. The operation of the pads 28 and manifolds 31 will be discussed more fully hereinafter with reference to FIG. 4. However, in FIG. 1 manifold 31 is shown with six air outlets 36, one of which is shown connected through wall 23 to a pad 28 by means of a conduit 37. In a preferred embodiment of the invention, six conduits 37 are connected, each through a bore 38 in the side wall, to a pad 28 in the interior open volume defined by the carriage. In a second embodiment of the invention, not shown, the conduits 37 are routed around the ends of the carriage 11. The first arrangement is preferred in that the conduits 37 are less likely to become snagged or otherwise interfered with by the lathe mechanisms. In the remainder of the discussion, the first embodiment will be the focus, however, it should be appreciated that the second arrangement could just as readily be used, or a combination of the two arrangements for routing the conduits is feasible.

In operation, when air or other fluid material under controlled pressure is applied to the manifold inlet 36, with inlets not in use being plugged, the air is evenly divided among the six outlets 36 and passes through conduits 37 to the individual pads 28, to emerge from their flat faces and force the pads 28 away from the surfaces of the lathe ways 13 and 14. The studs 29 are adjusted to control the limiting spacing of the faces from the ways 13 and 14, and, inasmuch as there are a total of twelve pads; two beneath each way; two adjacent the side of each way; and two above the top surface of each way; the carriage actually floats in contact free relationship on each of the three axes relative to the lathe 12. The studs 29 enable fine tuning of the structure to set the most desirable spacing of the face of the pads from the adjacent surface of the way. Once tuned, the studs are locked in place by suitable locking means, such as lock nuts 35, one of which is shown in FIG. 3.

Figure 2:
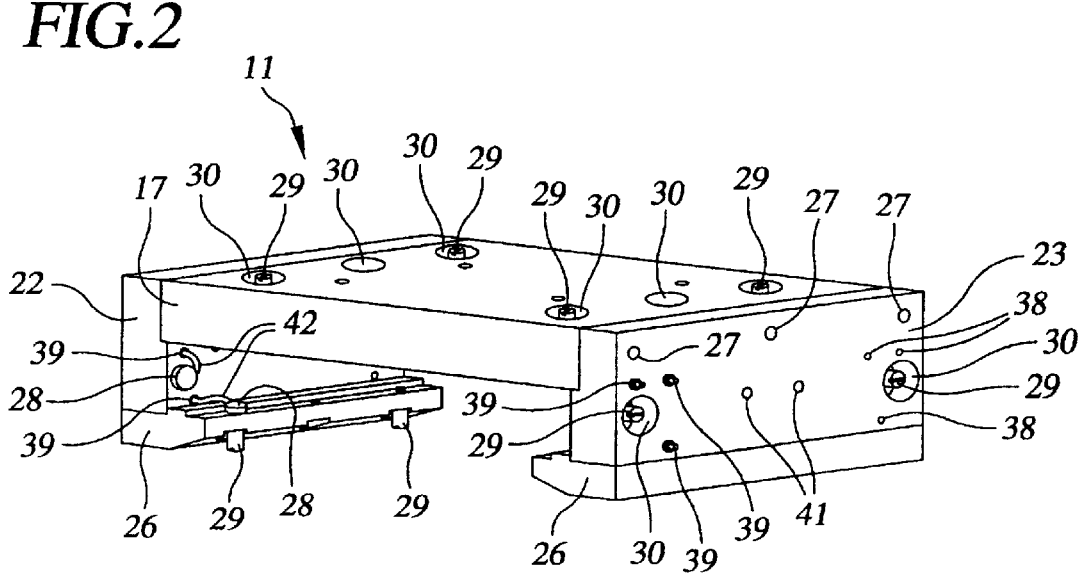
FIG. 2 is a perspective view of the carriage embodying a portion of the apparatus of the invention.

FIG. 2 is a perspective view of the carriage 11 showing, in more detail, some of the elements referred to in the discussion of FIG. 1. It can be seen that, adjacent one of the studs 29 in the sidewall, the bores 38 have couplings 39 mounted therein to which are to be attached the conduits 37 from manifold 31. It is to be understood that all of the bores 38, which total twelve, are to have couplings 39 affixed therein. Alternatively, bores 38 may be made large enough for conduits 37 to pass therethrough, to couple directly to pads 28, or an interior coupler 39 to which conduits 42 are connected. Also shown are bores 41 in sidewall 23 for mounting manifold 31. Although not shown, sidewall 22 has like bores 41 for mounting the second of the two manifolds 31. Also shown are two of the twelve pads 28, one mounted on the interior of sidewall 22 facing inwardly and the other mounted on flange members 26 and facing upwardly. The pads 28 are connected via conduits 42 through the bores 38 and couplers 39 to the manifold 31, not shown. The pads 28 are located such that the lower pads are beneath and closely adjacent to and face the smooth undersides of rails 12 and 14; the sidewall pads are closely adjacent to and face the smooth sides of rails 12 and 14; and the upper pads are closely adjacent to and face the smooth top surfaces of the rails 12 and 14. Thus, when pressurized air or other fluid is applied to the porous pads 28, a space is maintained between all of the pads and their corresponding rails and the carriage 11 floats without contacting the rails 12 and 14. Further in order to insure stability of the carriage and prevent it from cocking relative to any of the three axes, the pads are placed relatively far apart so that they are closely adjacent the front and rear ends of the carriage. As will be seen more clearly hereinafter, the pads 28 are not fastened to their corresponding studs 29, being free to "wobble" relative thereto. Thus, the pads 28 are, in effect, self leveling and free from any binding to the end of the stud. It can be seen that, with the arrangement just described, it is not necessary to use lubricants to insure smooth movement of the driven carriage inasmuch as there is virtually no friction between the carriage and its bearings (pads 28) and the lathe.

Figure 3:
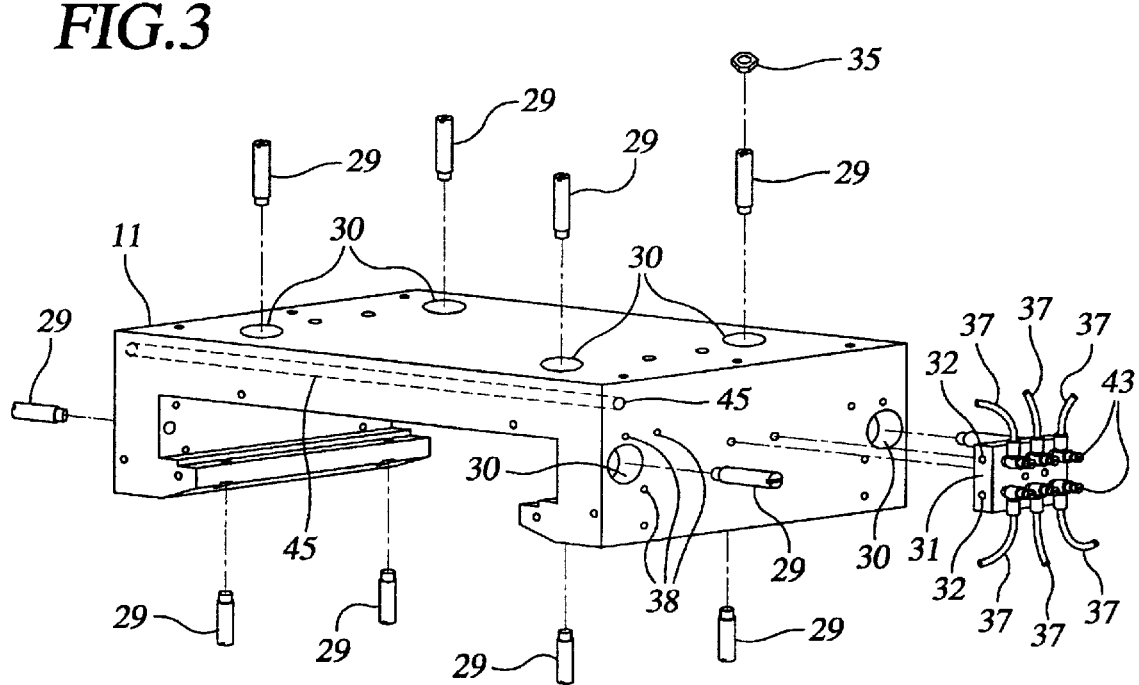
FIG. 3 is an exploded perspective view of the carriage of FIG. 2.

FIG. 3 is an exploded perspective view of the carriage 11 as formed in a single block, having been milled from a block of suitable metal, such as, for example, aluminum, and showing one of the manifolds 31 with needle valves 43 mounted in the outlet holes 36.

Figure 4:
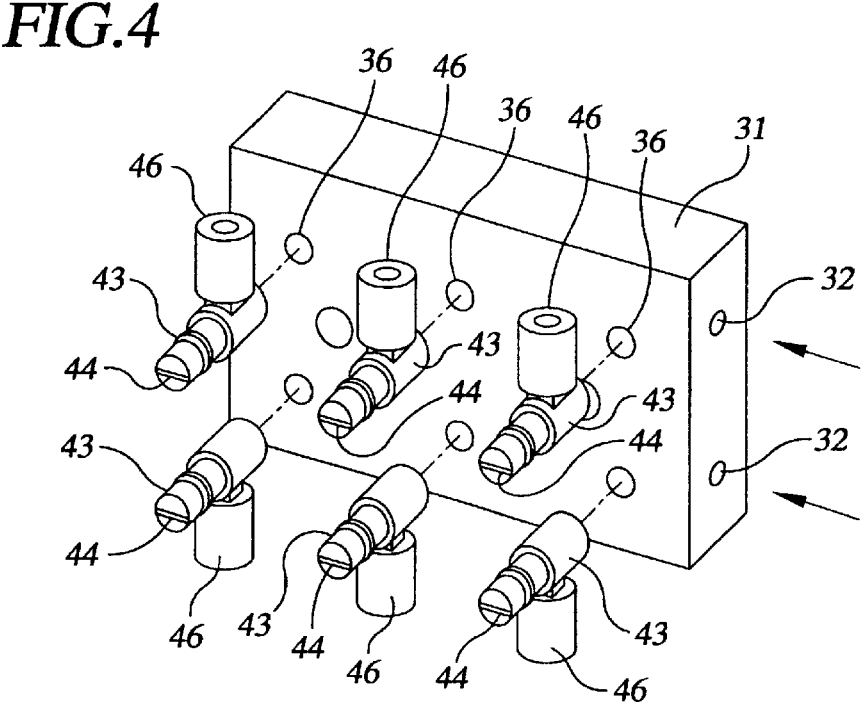
FIG. 4 is a perspective view of the manifold device for use with the carriage of FIGS. 2 and 3.
Figure 5A:
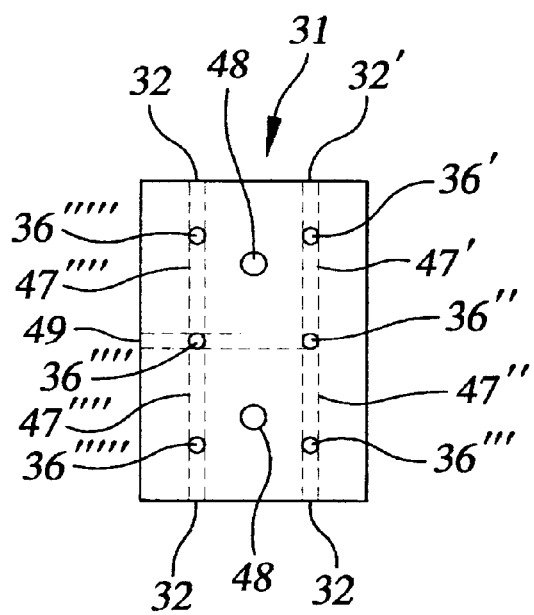
FIGS. 5a, 5b, and 5c are several views of the manifold of FIG. 4.

As best seen in FIG. 4, each needle valve 43 has an adjusting slot 44 and an output coupling 46 to which the conduits 37 (not shown in FIG. 4) are connected. Also shown are two of the air or gas inlet holes 32 which are to be coupled by suitable means to the pressurized fluid supply 33 by means of one or more conduits 34. It is usually the case that one inlet 32 is all that is necessary, in which case the remaining inlets are plugged by suitable means. However, there may be instances where more than one inlet is used for achieving an even pressurized fluid distribution within the manifold 31. Adjustment of the needle values 43 fine tunes the air bearings (pads 28) to achieve a balance among the several bearings by varying the amounts of pressurized air emerging from the front faces and hence, to a degree, the spacing between the front face and the lathe bed ways 13 and 14, thereby insuring a linear, non-cocking or canted separation of the carriage 11 from the ways.

Figure 5B:
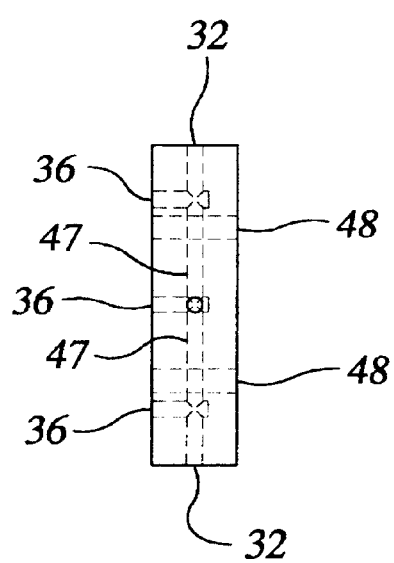
Figure 5C:
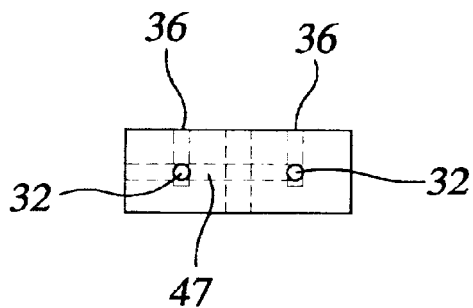

FIGS. 5a, 5b, and 5c are respectively, a plan view, a side elevation view, and an end elevation view of the manifold 31, illustrating how the input ports or bores 32 distribute the pressurized fluid to the several output ports or bores 36 through a network of internal bores 47, shown in dashed lines. Also shown are mounting bores 48 which match with the bores 41 in the sidewalls for insertion of bolts (not shown) therein. As an example of the manifold operation, fluid applied to input 32' is emitted through outlet 36', and through bore 47' to outlet 36" and also passes through bore 47" to outlet 36'" (in this example, all other inputs 32 are plugged so that no fluid may escape). The fluid also travels through bore 47'" to outlet 36"", beyond outlet 36"" bore 47'" to outlets 36""'. At a fluid pressure of, for example, fifty-five pounds per square inch (55 psi) there is a substantially even distribution of fluid to the outlets 36, which, through adjustment of the needle valves, impinges upon the ways 13 and 14 to insure rectilinear floating of the carriage. It can be seen that all of the ports are connected together, hence, any one of them may function, as an output to supply air to the second manifold 31, as discussed hereinbefore.

Figure 6A:
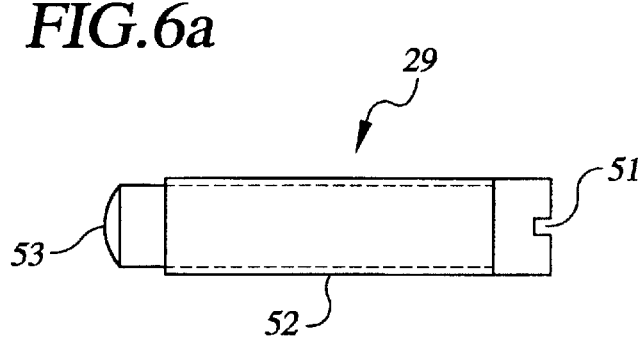
FIGS. 6a and 6b are views of the threaded stud for use in the carriage of FIGS. 2 and 3.
Figure 6B:
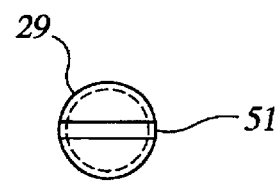

FIGS. 6a and 6b are side elevation and rear elevation views of a threaded stud 29 which is threaded into the threaded bores 30. Stud 29 has, at one end, an adjusting slot 51 for adjusting the distance the threaded body 52 is inserted into the bore and, at the other end has a substantially convex hemi-spherical or domed nose 53 of a slightly reduced diameter. As pointed out hereinbefore, each of the studs after adjustment, is locked in place by lock nuts 35, for example.

Figure 7A:
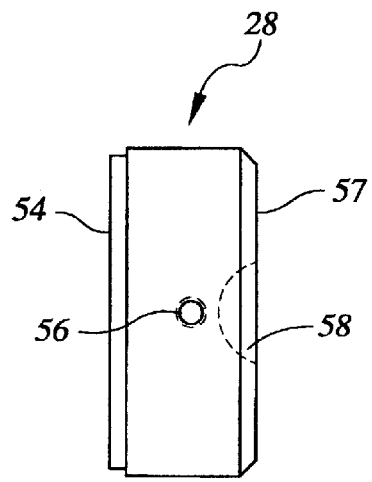
FIGS. 7a and 7b are views of the air bearing or pad used with the carriage of FIGS. 2 and 3.
Figure 7B:
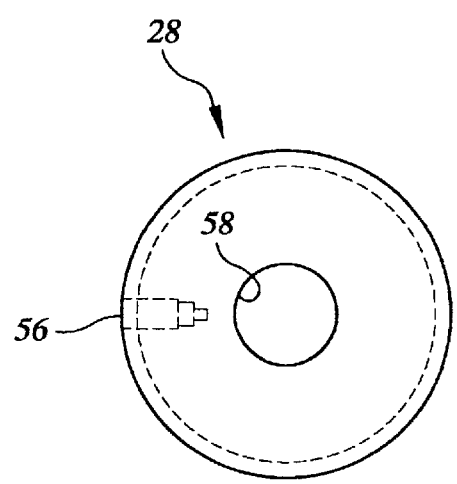

FIGS. 7a and 7b are a side elevation view and a plan view of a pad 28, a commercially available item commonly referred to as an air bearing. Pad 28 is preferably made of porous graphite and has a smooth, flat front face 54 through which pressurized fluid is emitted. The remainder of the exterior of the body of pad 28 is non-porous so that fluid introduced into the body thereof through an inlet coupling hole 56 can only be emitted through face 54. On the rear face 57 of pad 28 is a centrally or axially located semi-spherical concave recess 58 which is dimensioned to receive domed nose 53 of stud 29, thereby forming a quasi ball joint when the two are assembled. Pad 28 is free to wobble on nose 53, but when pressurized fluid is applied and face 54 is adjacent a flat portion of one of the rails or ways 13 and 14, face 54 is forced into a position that is parallel to the surface of way 13 and 14. This effect is optimized by adjustment of stud 29, by adjustment of the pressurized fluid source, and by adjustment of the needle valves 43. As pointed out hereinbefore, such adjustments insure that carriage 11 floats free of any contact with the lathe throughout the length of its travel, assuming completely flat rails 13 and 14. Although the pad 28 is shown in FIG. 7b as being circular, it may have other configurations such as, for example, rectangular or elliptical or other shapes.

From the foregoing, it can be seen that the carriage 11 of the invention does not require lubricant, and is substantially completely free of "stick-skip" and "jerk", thereby insuring consistently high quality product and reduced down time for apparatus cleaning.

The carriage of the invention has been shown and described as having pads 28 positioned to cause floating of the carriage with rails or ways having upper, lower, and side guiding surfaces. It is possible that the carriage may be used on a lathe bed wherein the ways have only one or two guiding surfaces, in which case some of the pads 28 will not be necessary in achieving substantially frictionless movement of the carriage. The principles and features of the invention nonetheless apply to such arrangements. It is also possible that a combination of air bearings and contact bearings may be desired in which case only enough pads 28 necessary to achieve such a configuration need be used.

It is to be understood that the various features of the present invention might be incorporated into other types of apparatus and that other modifications or adaptations might occur to workers skilled in the art. All such variations and modifications are intended to be included herein as being within the scope of the invention as set forth in the claims. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A carriage assembly for use on a bed having rails with guiding surfaces, and comprising
    a carriage member having a top plate, first and second side walls depending from said plate, and first and second flanges on the bottom of said side walls extending from said side walls toward each other;
    said top plate having first spaced air bearing members overlying a top guiding surfaces of the rails; and
    a manifold member for supplying pressurized air to said air bearing member.

2. A carriage assembly as claimed in claim 1 wherein at least one of said side walls has second spaced air bearing members positioned to be adjacent a side guiding surface of one of said rails, said manifold member being adapted to supply pressurized air to said second air bearing members.

3. A carriage assembly as claimed in claim 2, wherein the other of said side walls has third spaced air bearing members positioned, to be adjacent a side guiding surface of another of the rails, said manifold member being adapted to supply pressurized air to said third air bearing member.

4. A carriage assembly as claimed in claim 3 wherein said manifold member has valve members for controlling the quantity of air delivered to each of said air bearing members.

5. A carriage assembly as claimed in claim 1 wherein said manifold member has at least one input port for receiving pressurized air from a source thereof.

6. A hydrostatic guidance system for a lathe carriage wherein the lathe has at least two ways having top, bottom, and side guiding surfaces, said system comprising:
    a carriage member having a top plate having an inner surface for overlying the top guiding surfaces of the ways;
    first and second side walls depending from said top plate and having outer surfaces and inner surfaces adapted to be adjacent the side guiding surfaces of the ways;
    first and second flanges along the bottoms of said side walls and extending therefrom towards each other and having a top surface underlying the bottom guiding surfaces of the ways;
    first and second spaced pairs of spaced air bearing members extending from said inner surface of said top plate and positioned to overlie the top guiding surfaces of the ways;
    third and fourth spaced pairs of spaced air bearing members extending from the inner surfaces of said side walls adapted to be adjacent the side guiding surfaces of the ways;
    fifth and sixth pairs of spaced air bearing members extending from the top surfaces of said flanges and adapted to underlie the bottom guiding surfaces of the ways; and
    first and second manifold members mounted to said carriage member and each having at least one air input port for connection to a source of pressurized air and a plurality of outputs each of which is connected to one of said air bearing members for supplying pressurized air thereto.

7. A hydrostatic guidance system as claimed in claim 6 wherein each of said outputs is connected to one of said air bearing members by means of a conduit.

8. A hydrostatic guidance system as claimed in claim 7 wherein each of said side walls has a plurality of bores therein forming passages from said outer surfaces to said inner surfaces.

9. A hydrostatic guidance system as claimed in claim 8 wherein each of said bores is adapted to be connected to one of said conduits from one of said outputs on one of said manifold members.

10. A hydrostatic guidance system as claimed in claim 9 wherein each of said bores is connected from the inner surface of its side wall to one of said air bearing members by means of an air conduit.

11. A hydrostatic guidance system as claimed in claim 7 wherein each of said outputs in each of said manifold members has a valve member mounted therein to which one end of one of said conduits is connected.

12. A hydrostatic guidance system as claimed in claim 11 wherein said valve member in each of said outputs is a needle valve.

13. A hydrostatic guidance system as claimed in claim 12 wherein said needle valve in each of said outputs is adjustable for controlling the amount of air passing from said output.

14. A hydrostatic guidance system as claimed in claim 6 wherein each of said manifold members has a plurality of air passages therein interconnecting said outputs to each other and to said air input.

15. A hydrostatic guidance system as claimed in claim 14 wherein each of said manifold members has a plurality of air inputs ports which are connected to each of said outputs by means of said plurality of air passages.

16. A hydrostatic guidance system as, claimed in claim 15 wherein one of said air input ports in said first manifold member is connected to a source of pressurized air and a second one of said air input ports in said first manifold member is connected to an air input port of said second manifold member by a pressurized air passage.

17. A hydrostatic guidance system as claimed in claim 6 wherein each of said air bearing members is supported on a first end of a stud member having first and second ends and extending through the corresponding carriage member wall.

18. A hydrostatic guidance system as claimed in claim 17 wherein each of said studs is threaded into the corresponding wall of said carriage member.

19. A hydrostatic guidance system as claimed in claim 18 wherein said first end of each of said studs has a nose having a convex dome adapted to fit within a concave recess in its corresponding air bearing.

20. A hydrostatic guidance system as claimed in claim 19 wherein said second end of said stud has means for adjusting the position of said stud within the corresponding wall of said carrier member.

21. A hydrostatic guidance system as claimed in claim 20 and further including a locking member for each of studs for locking said stud in its adjusted position.

* * * * *